United States Patent [19]
Henley

[11] 3,947,312
[45] Mar. 30, 1976

[54] APPARATUS FOR MAKING PNEUMATIC TIRES TORICALLY WITH AN ANNULAR GUIDE ASSEMBLY

[75] Inventor: Virgil E. Henley, Akron, Ohio

[73] Assignee: The General Tire and Rubber Company, Akron, Ohio

[22] Filed: Nov. 26, 1974

[21] Appl. No.: 527,328

Related U.S. Application Data

[63] Continuation-in-part of Ser. No. 398,051, Sept. 17, 1973, abandoned.

[52] U.S. Cl............. 156/415; 156/127; 156/128 T; 156/416; 156/405
[51] Int. Cl.² ........................................ B29H 17/16
[58] Field of Search............ 156/414, 405, 398–403, 156/415, 416, 127, 128 I

[56] References Cited
UNITED STATES PATENTS

| | | | |
|---|---|---|---|
| 1,441,767 | 1/1923 | Williams | 156/399 |
| 1,562,754 | 11/1925 | Gautier | 156/403 X |
| 2,455,038 | 11/1948 | Breth | 156/402 |
| 3,047,450 | 7/1962 | Drakeford et al. | 156/128 X |
| 3,184,361 | 5/1965 | Allitt | 156/416 X |
| 3,374,138 | 3/1968 | Porter et al. | 156/400 |
| 3,434,897 | 3/1969 | Caretta et al. | 156/403 |
| 3,475,254 | 10/1969 | Henley | 156/401 |
| 3,721,600 | 3/1973 | Cantarutti | 156/401 |
| 3,740,292 | 6/1973 | Leblond | 156/416 |
| 3,873,397 | 3/1975 | Leblond et al. | 156/400 |

Primary Examiner—Clifton B. Cosby

[57] ABSTRACT

A pneumatic tire building machine with a rotatable building drum adapted for forming thereon a tire carcass of rubberized plies and for expanding the formed carcass to a toric shape. A transfer mechanism positions a separately formed tread and belt assembly substantially concentrically around and spaced from the tire carcass disposed on the building drum. Annular guide means with rolling surfaces are also positioned substantially concentrically around and spaced from the tire carcass disposed on the building drum. When the tire carcass is expanded to a toric shape, the carcass contacts the guide means in rolling engagement and is guided to mate in precision alignment with the tread and belt assembly.

9 Claims, 11 Drawing Figures

APPARATUS FOR MAKING PNEUMATIC TIRES TORICALLY WITH AN ANNULAR GUIDE ASSEMBLY

CROSS REFERENCE TO RELATED APPLICATION

This application is a continuation-in-part of copending U.S. patent application Ser. No. 398,051 filed Sept. 17, 1973 entitled "Apparatus And Method For Making Pneumatic Tires Torically With An Annular Guide Assembly" now abandoned.

BACKGROUND OF THE INVENTION

This invention relates to an apparatus for building pneumatic tires and particularly radial cord type tires. Pneumatic tires and particularly bias type pneumatic tires have been generally built in a flat annular band and subsequently expanded to the toric shape while being cured in a mold. Illustrative of the art generally are the equipment and methods described in U.S. Pat. Nos. 2,614,951, 2,614,052, 3,171,769, 3,156,601 and 3,645,826, which are owned by the assignee of the present application. Pneumatic tires of the radial type, on the other hand, have been commercially built by the "toric match" method where the tire carcass is assembled in a flat annular band and then expanded to a toric shape in order to apply a separately formed tread and belt assembly. Such equipment for making radial type tires is described and claimed in U.S. Pat. No. 3,475,254, which is also owned by the assignee of the present application.

In a typical radial tire, cords in the carcass plies extend from bead portio to bead portion in a direction substantially perpendicular to the circumferential centerline of the tire. The cords in the belt strips typically extend across the same circumferential centerline at a small angle (i.e., 20° or less). As a result, belt assemblies used in radial tire construction are radially substantially inextensible. For this reason, the carcass of the tire on the one hand and the tread and belt assembly on the other are typically assembled in separate flat annular bands of different diameter. Thereafter, it is necessary that the tire carcass be expanded to a toric shape approximating its final diameter before applying the separately built tread and belt assembly.

Non-uniform or asymmetric toric expansion of the tire carcass can cause structural imperfections in the resulting tire. For example, the tire carcass or the carcass building drum shaping bladder, or both, may have surface eccentricities or imperfections. These imperfections are accentuated during the toric expansion of the carcass and can cause the tire carcass and the tread and belt assembly to mate irregularly and in misalignment. The resulting pneumatic tire thus possesses irregularities which can adversely effect the tire's overall performance.

Attempts have been made to provide annular guides for use in shaping the carcass during its radial expansion into toric shape. For example, tire building drums with such carcass shaping guides are disclosed in U.S. Pat. Nos. 3,047,450, 3,184,361, 3,434,987 and 3,740,292. A principal disadvantage of these types of annular guides, however, is that they produce frictional engagement between the guides and the tire carcass. This sliding friction can result in uneven and irregular expansion.

The present invention substantially reduces or eliminates such difficulties and disadvantages in the toric mating of a radial type tire carcass with a tread and belt assembly. It provides a means by which the tire carcass is mated with the tread and belt assembly substantially regularly, uniformly and, when desired, symmetrically.

The equipment in association with which the present invention is used is adapted to make radial type pneumatic tires by a technique that includes building a tire carcass on a carcass building and shaping drum rotatably mounted on a shaft. A rubberized cord ply or plies are disposed around the building drum to form an annular carcass band with edge portions over-hanging the ends of the drum. Bead portions are then formed in the carcass band preferably by forming bead ring receiving shoulders at the ends of the drum, and setting or abutting separately assembled annular bead rings at the formed bead ring receiving shoulders. The bead portions are completed by utilizing turnover means which wrap edge portions of the ply or plies around the bead rings where the edge portions are stitched to the outer surface of the carcass band. Other components such as sidewall assemblies, chafer strips, etc., can then be applied to complete the tire carcass.

Thereafter, transfer means grip a tread and belt assembly and position said assembly circumferentially around and precision spaced from the tire carcass, in precision alignment relative to the tire carcass, symmetrically or asymmetrically of the circumferential centerline of the tire carcass as desired. Typically, for radial type tires, the tread and belt assembly includes inextensible belts of spaced, substantially rubberized parallel cords overlayed with a suitable tread rubber annulus. The tread and belt assembly is usually separately assembled on a second building drum and transported by transfer means into concentric position in a manner similar to that described in the above-mentioned U.S. Pat. No. 3,475,254.

SUMMARY OF THE INVENTION

It is among the objects of the invention to guide the tire carcass during its expansion to a toric shape to provide improved accuracy in the mating of the carcass with the tread and belt assembly.

Another object is to guide the expanding tire carcass into precision alignment with the tread and belt assembly as described above with a minimum of surface friction between the carcass and the guide means.

These and other objects and advantages are accomplished with the apparatus of the present invention which is used in association with the radial cord tire building equipment of the type described above. In accordance with the invention a pair of annular guide members are positioned circumferentially around and spaced from the building drum in precision preset positions relative to the tire carcass. The guide members contact the tire carcass as the carcass is expanded to a toric shape, preferably by an inflatable shaping bladder, and guide carcass to mate with the tread and belt assembly in precision alignment, symmetrically or asymmetrically of the circumferential centerline of the tire carcass as desired. Preferably, axial adjustment means in the carcass building and shaping drum simultaneously move the bead portions of the carcass relative to each other as the carcass is expanded to properly shape the carcass to substantially its finished contour. The tread and belt assembly is then released from the transfer means and stitched to the tire carcass to complete the building of the pneumatic tire.

Each of the guide members comprises a core ring of circular cross section, supported at a plurality of spaced circumferential locations, and a plurality of flexible helical segments slidably received on the core ring and adapted for free rotary movement thereon about the circular axis defined by the center of the core ring cross section.

The core ring is preferably supported by other existing parts of the tire building machine such as the bead ring setting means of the carcass building and shaping apparatus, or the transfer means for transferring the tread and belt assembly concentrically over the carcass building drum. During the expansion of the tire carcass it contacts the helical segments in rolling engagement therewith so that the guide members guide the tire carcass to accurately mate symmetrically or asymmetrically with the tread and belt assembly as desired.

Other details, objects and advantages of the invention will become apparent as the following description of the presently preferred embodiments thereof and presently preferred methods of practicing the same proceeds.

BRIEF DESCRIPTION OF THE DRAWINGS

Referring to the accompanying drawings, the presently preferred embodiments of the invention and presently preferred methods of practicing the same are shown in which.

DESCRIPTION OF THE PREFERRED EMBODIMENTS

The present invention is particularly described in reference to the pneumatic tire building machine used in making radial type pneumatic tires as described and claimed in U.S. Pat. No. 3,475,254, which is owned by the assignee of the present application. The present invention is an improvement on the tire building machine described in U.S. Pat. No. 3,475,254. This description by reference is, however, only for purposes of illustration and convenience. The invention may be otherwise variously embodied in making pneumatic tires and may, indeed, provide utility in making other types of tires by the "toric match" method if so desired.

Figure 1:
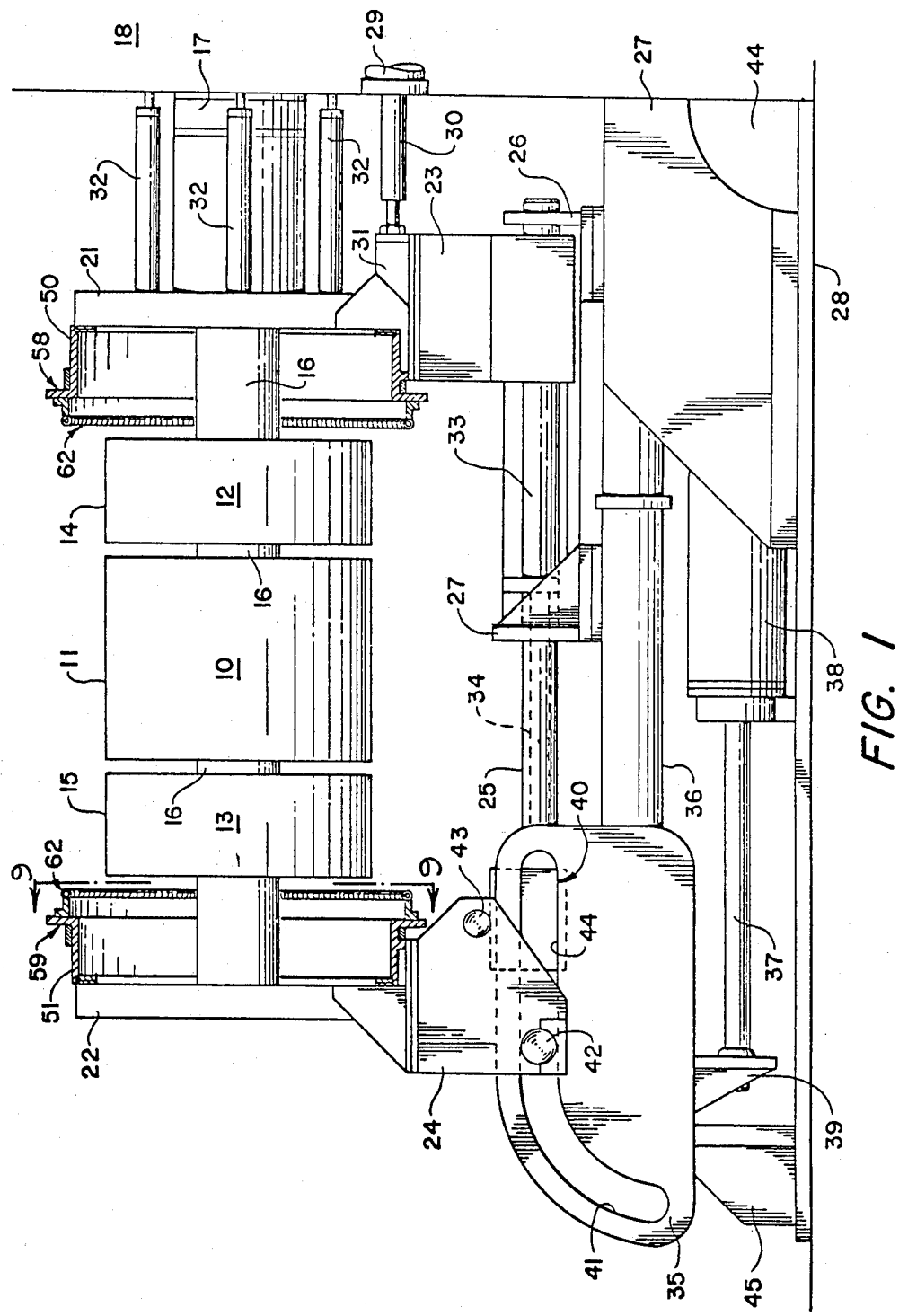
FIG. 1 is an elevational view of a tire carcass building and expanding apparatus of a tire building machine.

Referring to FIG. 1, a carcass building and shaping apparatus which is suitable for use in a pneumatic tire building machine in accord with the present invention is illustrated. Operation of the carcass building and shaping apparatus in the total tire building machine as well as the detailed operation of the carcass building and shaping apparatus itself is described by reference in U.S. Pat. No. 3,475,254. The operation will be reiterated here only to the extent that the operation pertains to the functional description of the present invention to the extent which seems necessary.

Specifically, FIG. 1 shows a carcass building and shaping apparatus with building drum 10 having a substantially cylindrical outer surface 11 and inboard and outboard annular extensions 12 and 13 having substantially cylindrical outer surfaces 14 and 15, respectively. Building drum 10 and annular extensions 12 and 13 are mounted in cantilever on rotatable shaft 16, which is connected through rotary seal hub 17 and housing 18 to a suitable power means (not shown). The surface 11 of drum 10 is composed of a tubular inflatable shaping bladder 19 (see FIG. 2, et seq.) and the surfaces 14 and 15 of annular extensions 12 and 13 are composed of tubular inflatable turnover bladders (not shown; see U.S. Pat. No. 3,475,254.

The tire carcass is built on drum 10 by disposing rubberized plies typically symmetrically around drum 10, said plies being wider than drum 10 and overlapping onto surfaces of extension 12 and 13 by substantially equal distances. The plies are removed in a series from suitable service equipment (not shown) located near the building drum 10 (which equipment does not constitute a part of the invention) and wrapping the plies one at a time around the drum with the edge portions overlapping in substantially parallel textile or metal cords coated with a suitable elastomer. And, in the production of a radial type tire, the cords lie in a direction which is substantially parallel to the area of drum 10. Shoulder forming bladders 20 (see FIG. 2, et seq.) underlying the shoulder portions of drum 10 are inflated so that the drum assumes a uniform diameter which is greater than the diameters of the extensions 12 and 13 and in turn provides suitable receiving shoulders at the ends of the drum against which annular inextensible bead rings are subsequently abutted.

Previously, bead rings have been placed upon inboard bead ring carrier 21 which is vertically aligned with the axis of the drum 10, and bead rings have been placed upon outboard bead ring carrier 22 which pivots from a horizontal to a vertical position. Inboard bead ring carrier 21 is mounted on carriage 23, and outboard bead ring carrier 22 is mounted on carriage 24. Carriages 23 and 24 are adapted to move along parallel guide rods 25 supported by bracket 26 adjacent housing 18, intermediate bracket 27 and outer bracket (not shown), which are in turn supported on base 28.

First pneumatic cylinder 29 is provided within housing 18 with piston 30 attached to carriage 23 at bracket 31 to move carrier 21 axially toward and away from building drum 10. A plurality of springloaded rods 32 are also circumferentially disposed about inboard carrier 21 and are adapted to abut housing 18 when carrier 21 is retracted. Rods 32 facilitate the manual placement of a bead ring within inboard carrier 21.

The outboard ring carrier is moved axially toward and away from drum 10 by second pneumatic cylinder 33 with piston 34 (seen in outline behind guide rod 25). In addition, a pair of rigid cam plates 35 are rigidly mounted on opposite sides of carriage 24 and are both attached to a carrier (not shown) which is adapted to slidably move in a horizontal direction on a pair of guide rods 36 located below and parallel to rods 25. Rods 36 are suitably mounted on brackets 27 and 45. Piston 37 of third pneumatic cylinder 38 is connected to bracket 39, which in turn is attached to the carrier (not shown) for shifting the cam plates 35 axially toward and away from drum 10.

Each cam plate 35 is provided with a horizontally extending slot 40 terminating outboard of drum 10 in a downwardly curved portion 41. A roller 42 attached to each side of carriage 24 of outboard bead ring carrier 22 rides in slot 40 of plate 35 adjacent to the side. Movement of cam plates 35 toward drum 10 when carrier 22 is in remote position relative to drum 10 causes rollers 42 to move in respective slots 41 in a downwardly directed path thereby causing the carrier to pivot about shaft 43 from a vertical to a horizontal position.

On the other hand, when cam plates 35 are remote from drum 10, rollers 42 are disposed in the horizontal portions 44 of slot 40 and carrier 22 is held in the vertical position free to move toward or away from drum 10 in axial alignment therewith.

Thereafter, bead ring carriers 21 and 22 are moved axially inwardly over annular extensions 12 and 13, respectively, to accurately abut the bead rings against receiving shoulders of caracass plies overlying the shoulders of drum 10. This axial movement is done by actuating pneumatic cylinders 29, 33 and 38 to simultaenously extend and retract the various pistons 30, 34 and 37. The carriers 21 and 22 are then moved axially outwardly from the shoulders of drum 10, by again actuating pneumatic cylinders 29 and 33, to a position when they are clear of the annular extensions 12 and 13, leaving behind accurately positioned bead rings at receiving shoulders of carcass plies. The turnover bladders at the cylindrical surfaces 14 and 15 are then pneumatically inflated to turn up the edges of the carcass plies overlying the extensions 12 and 13 and fold them around the positioned bead rings. When the turnover bladders are fully inflated, the cylinders 29 and 33 are again activated so that bead ring carriers 21 and 22 are again moved axially inwardly and the outer annular sleeves 50 and 51 of carriers 21 and 22, respectively, push the turnover bladders over the bead rings. Said movement, accompanied by deflation of the turnover bladders, cause the bladders to collapse in tight engagement with the plies on the surface 11 of drum 10, thereby folding the edges of the carcass plies into contact with the portions of the carcass plies overlying the drum 10 immediately adjacent and inwardly of said bead rings. The bead ring carriers 21 and 22 are then moved axially away from drum 10 by actuation of cylinders 29 and 33, carrier 22 horizontally positioned by actuation of cylinder 37, and the turnover bladders deflated. The folded edges of the plies are then mechanically stitched against the underlying portions of the plies to complete the bead portions of the carcass. The carcass is then completed by applying other components such as sidewall assemblies and chafer strips to the assembled plies and bead portions of the carcass.

Figure 2:
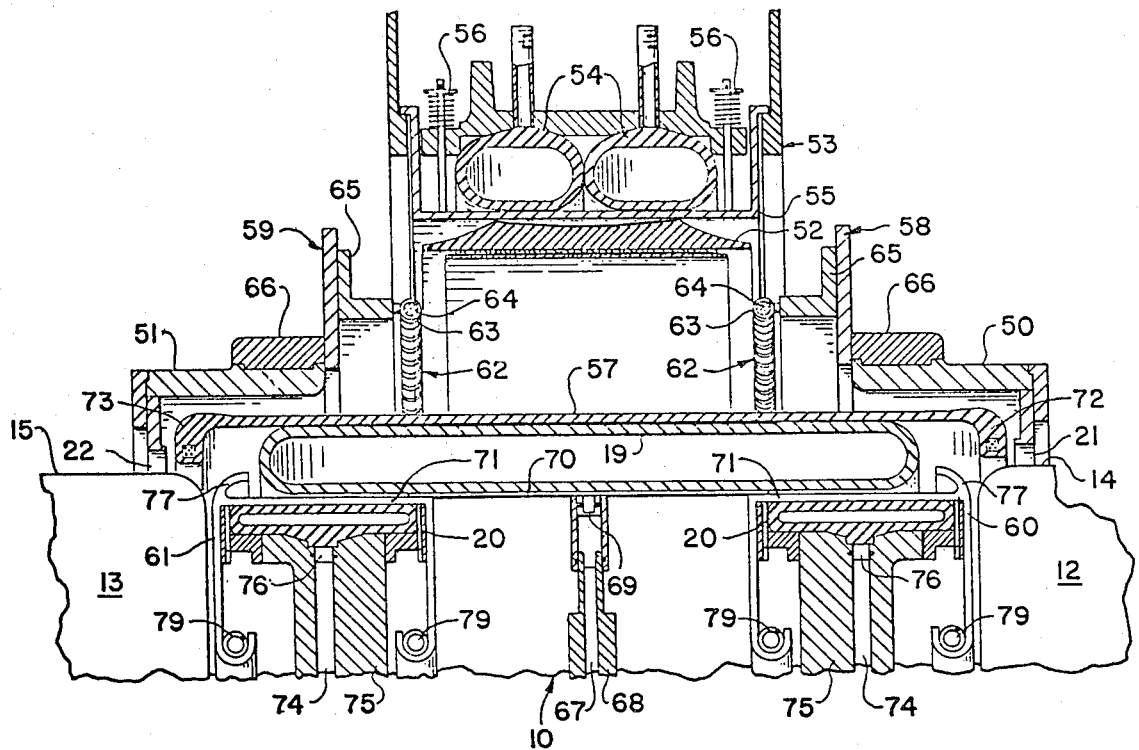
FIGS. 2 through 5 are partial cross-sectional views in elevation of a pneumatic tire building machine in various stages of operation in accord with and embodying the present invention.

Referring to FIG. 2, tread and belt assembly 52 that is formed, for example, as described in U.S. Pat. No. 3,475,254, is then gripped in transfer mechanism 53 by inflating bladders 54 against segments 55 which are mechanically biased by annular rows of springs 56. The details of the assembly and operation of transfer mechanism 53 are as described in U.S. Pat. No. 3,475,254. Transfer mechanism 53 with the tread and belt assembly 52 contained therein is then moved to a concentric position circumscribing and spaced from the finished carcass 57 on drum 10 symmetrically (as shown) or asymmetrically of the circumferential centerline of the carcass as desired.

The bead ring carrier 22 is vertically positioned and carriers 21 and 22 are again axially moved inwardly over annular extensions 12 and 13 to precision preset positions by actuation of cylinders 29, 33 and 38. In these preset positions, annular carcass guide assemblies 58 and 59 overlie and are precision aligned relative to shoulders 60 and 61, respectively, of drum 10 symmetrically or asymmetrically about the circumferential centerline of the carcass as desired. The annular carcass guide assemblies 58 and 59 are rigidly fastened to the outer annular sleeves 50 and 51, respectively.

Figure 9:
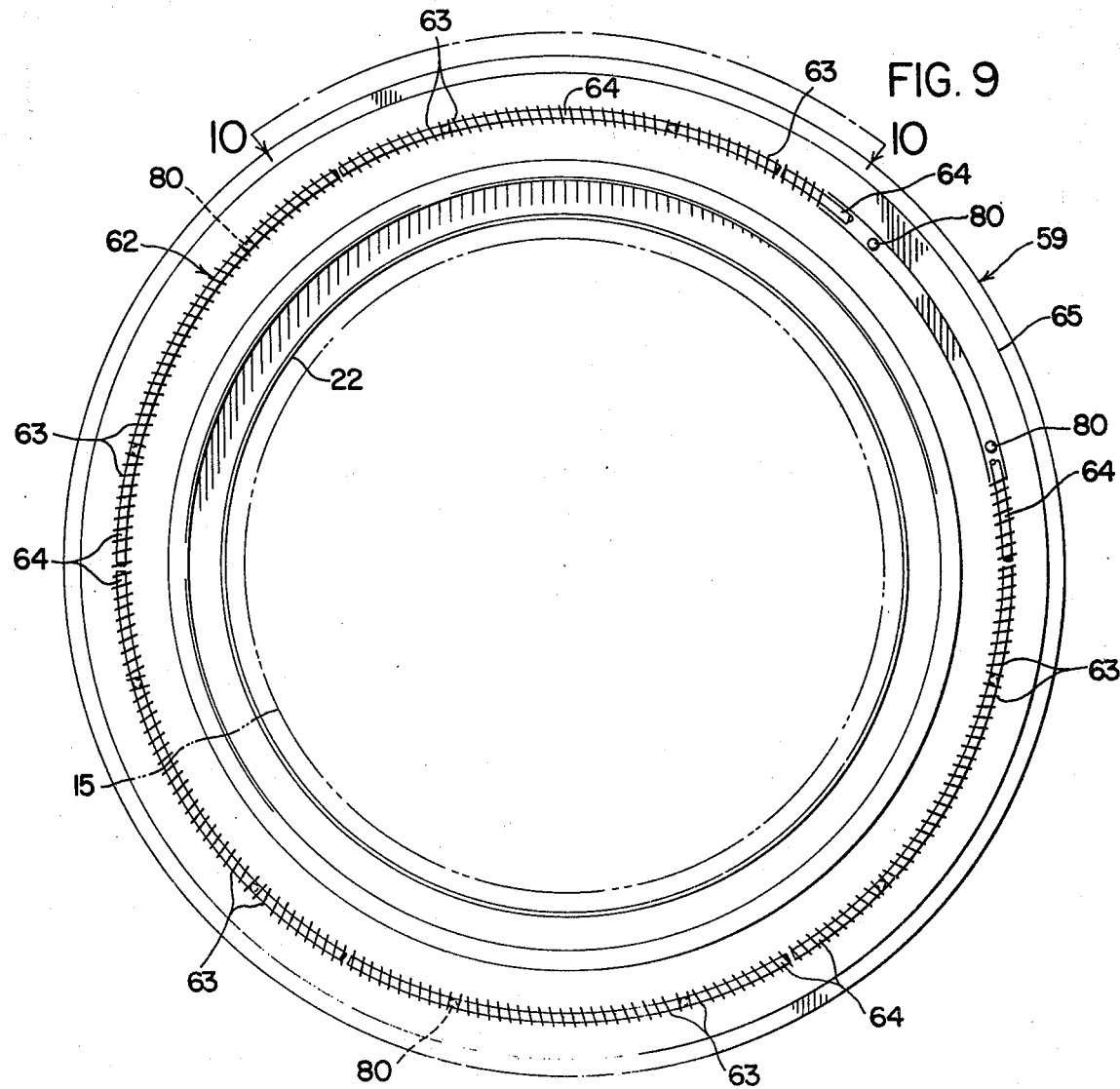
FIG. 9 is a sectional view on an enlarged scale taken on the line 9—9 of FIG. 1 and illustrating one of the annular guide members embodying the invention.
Figure 10:
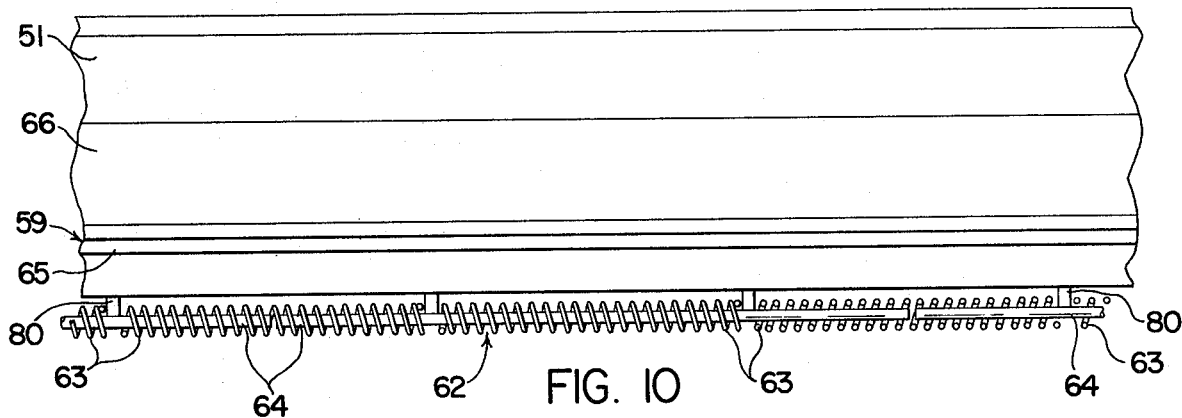
FIG. 10 is a fragmentary sectional view on a still larger scale taken on the curved section line 10—10 of FIG. 9.
Figure 11:
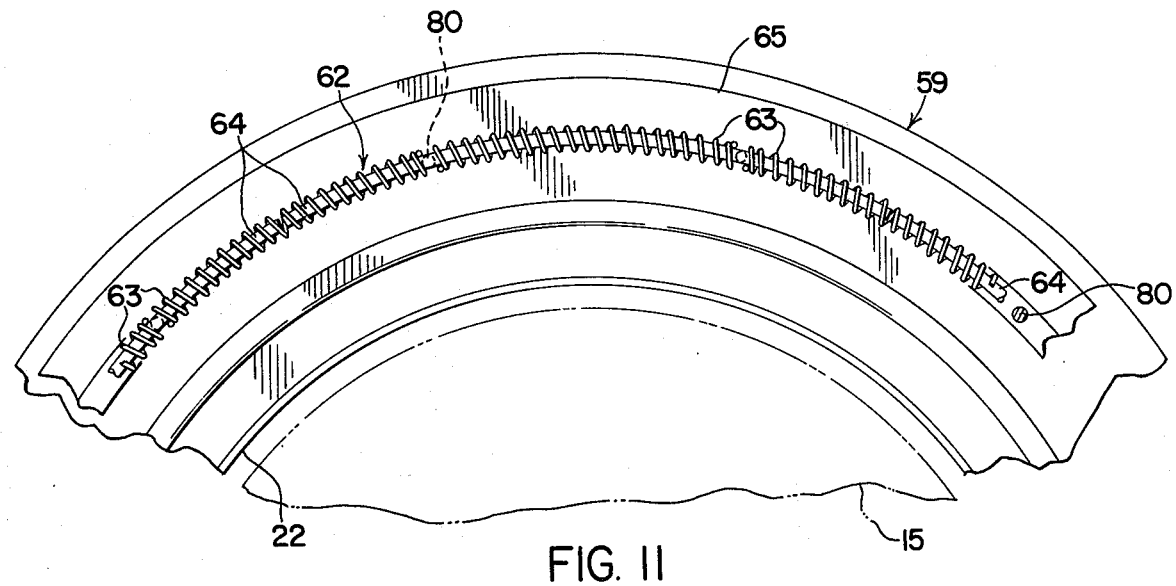
FIG. 11 is a fragmentary front elevation of the annular guide member and associated equipment of FIG. 10.

Each carcass guide assembly 58, 59, includes a carcass engaging guide member 62 consisting of a core ring having a generally circular cross section and formed of a plurality of curved core ring segments 64 arranged end to end to form a complete circle (FIGS. 9, 10 and 11). The segments 64 are supported by short axially extending posts 80 welded to an annular mounting bracket 65 forming part of the respective carcass guide assembly.

Figure 4:
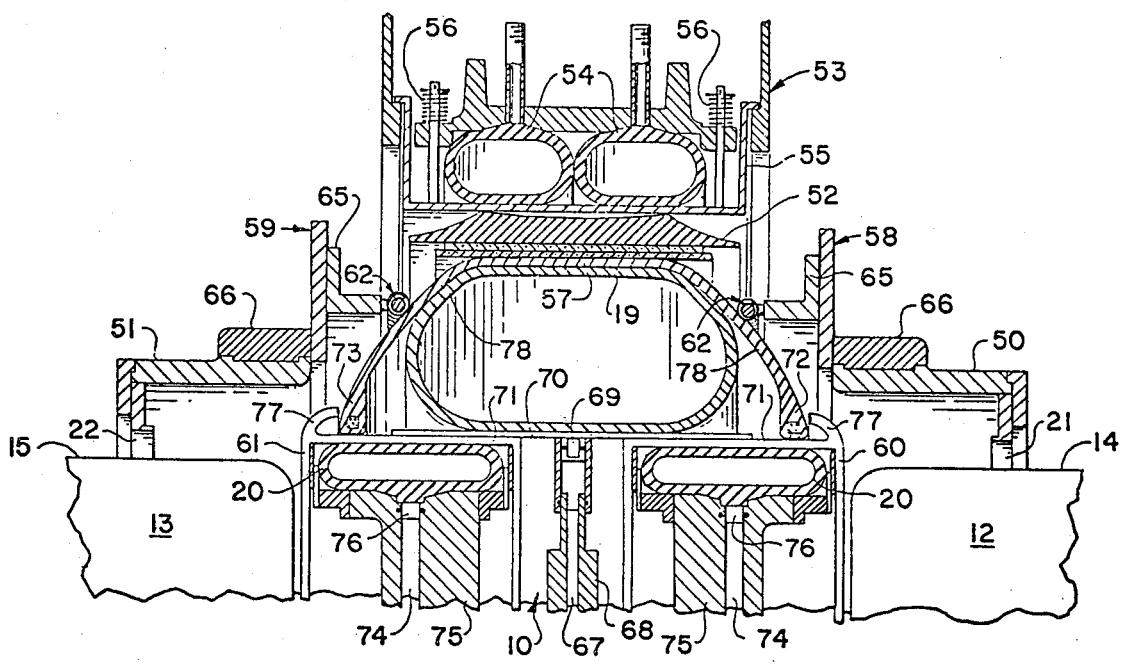
Figure 7:
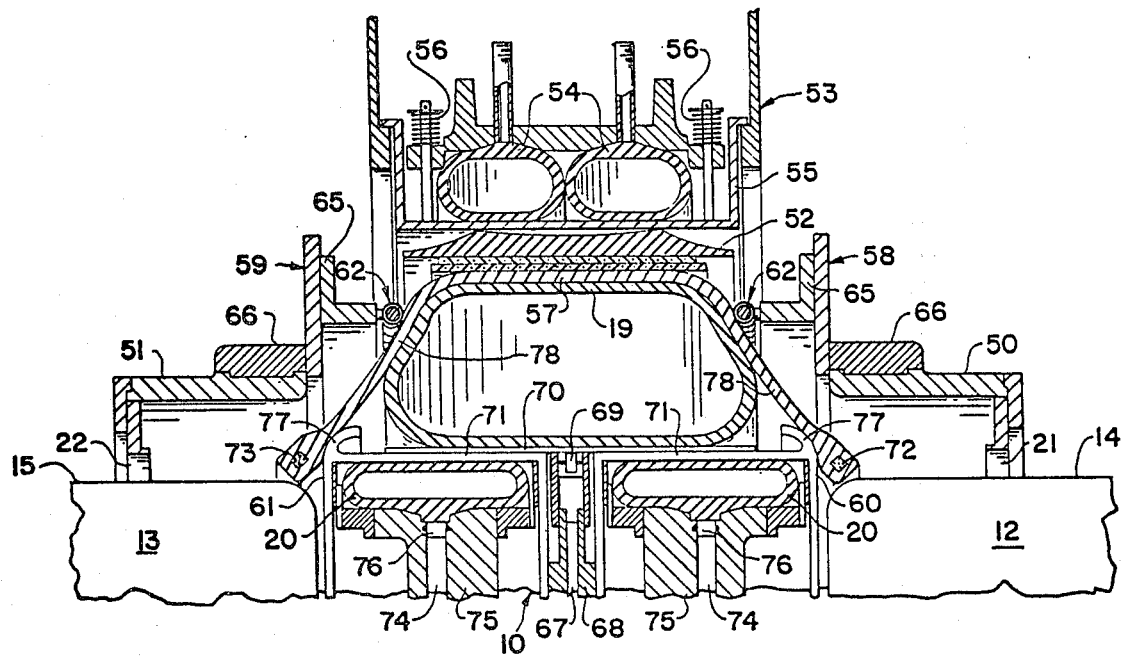

In the embodiment shown, six segments 64, each curved to form 60° of arc are used to complete the core ring. Each segment 64 is supported by two posts 80. Located between each adjacent pair of posts is an elongated helical element 63 slidably received over the respective corresponding curved segment 64 or portions of segments 64. The helical segments 63 are of spring-like construction and are adapted to flex to conform with the curvature of the segments 64 and to roll or revolve about the circular axis defined by the center of the core ring cross section. Accordingly, when the tire carcass 57 is expanded into toric shape, opposite side portions thereof contact the segments 64 in rolling engagement (FIGS. 4 and 7). This arrangement minimizes surface friction between the guide members 62 and expanding carcass 57.

OPERATION

Figure 3:
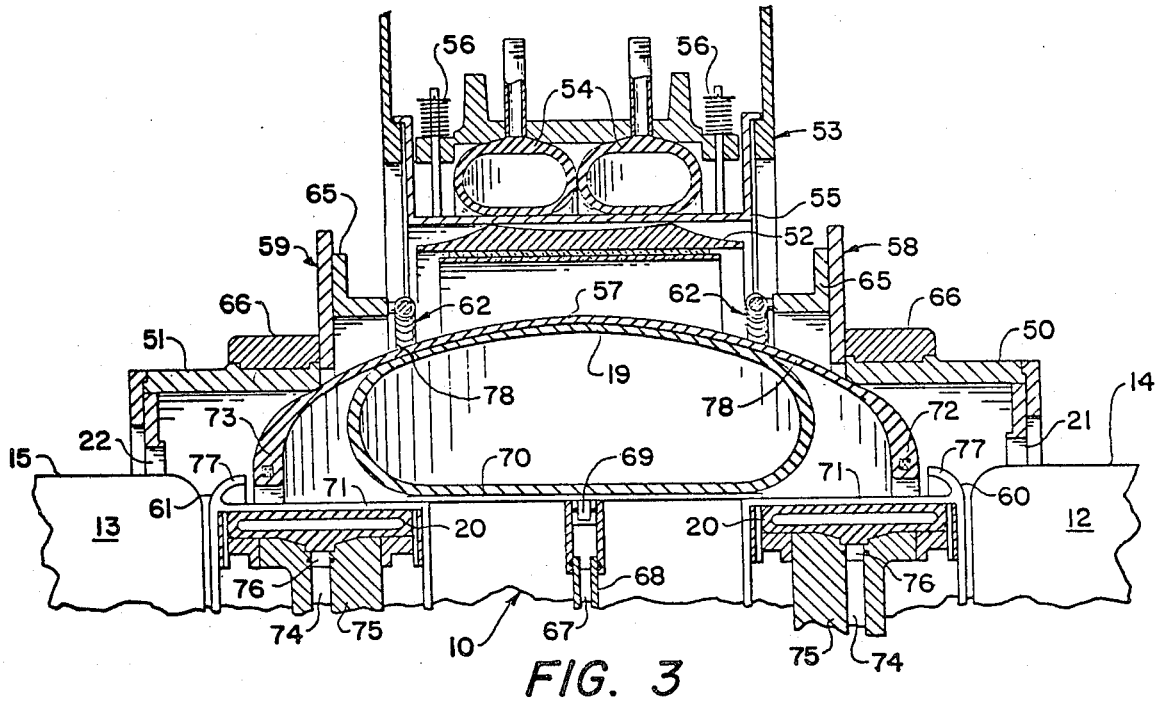

Referring to FIGS. 2 through 4, carcass 57 is expanded to the toric shape to mate with the tread assembly 52 in accord with the present invention. Expansion is commenced by introducing air through passageway 67 within spoke 68 of drum 10 and steam 69 of bladder 19 into shaping bladder 19 and concurrently deflating shoulder bladders 20. Bladder 19 is thus inflated moving the tire carcass 57 radially outwardly away from gap shields 70 and rows of segments 71 at each shoulder of drum 10. The expansion during the first stage of inflation of bladder 19 is, as shown in FIG. 2, in a band, compensating for the deflation of shoulder bladders 20. As a result, the bead portions 72 and 73 of carcass 57 free float away from the building drum and annular extensions.

As shown in FIG. 3, carcass 57 begins to expand into the toric shape by continued inflation of shaping bladder 19. This toric expansion causes the bead portions 72 and 73 to move inwardly toward each other, while shoulder portions of drum 10 are axially moved apart to permit the bead portions to clear outwardly extending shoulder portions 77, as hereinafter described.

As shown in FIG. 4, shoulder bladders 20 are then simultaneously inflated by introducing air through passages 74 in shoulder spokes 75 and stems 76 into bladders 20. The bead portions 72 and 73 are thus provided with lateral support by outwardly extending shoulder portions 77 of segments 71 as the expansion of the tire carcass continues. Sidewall portions 78 of carcass 57 then contact the respective guide members 62 of the annular carcass guide assemblies 58 and 59. The helical segments 63 engage and roll against the surface of the carcass 57 as the expansion proceeds. The carcass guide assemblies 58 and 59, with their positions precision preset by axially presetting carriers 21 and 22, thus guide the carcass into precision alignment, mating relation with the tread and belt assembly 52 about the circumferential centerline of carcass 57. Concurrently with the last stage of the toric expansion, a screw shaft (not shown) is rotated to move the shoulders 60 and 61 of drum 10 and in turn shoulder portions 77 of segments 71, with the bead portions 72 and 73 thereagainst, to move inwardly toward each other, and move the bead portions 72 and 73 together. Movement of the bead portions toward one another during the expansion of the carcass to the toric shape permits the expansion to be accomplished without causing severe stresses in the cords of the tire carcass 57.

Figure 5:
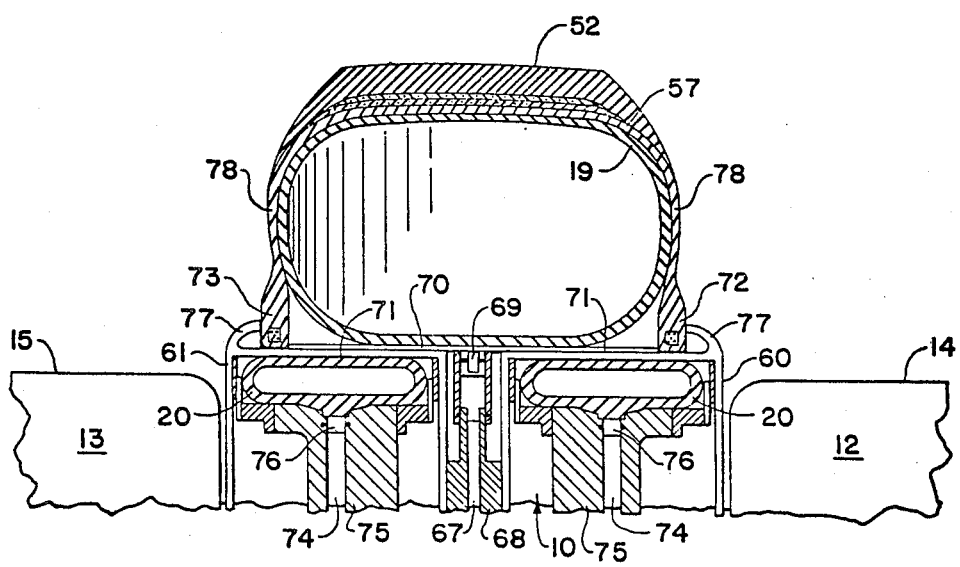

After carcass 57 has been expanded sufficiently to mate in precision alignment with the underside of tread assembly 52, with the assistance of the carcass guide assemblies 58 and 59, bladders 54 of the transfer means 53 are deflated so that segments 55 of the transfer means releases their grip on the tread and breaker assembly. Transfer means 53 is thus moved axially away leaving the tread assembly 52 behind precision positioned on the carcass 57. The bead ring carriers 21 and 22 with the carcass guide assemblies 58 and 59 attached are also moved axially away from drum 10 and outboard carrier 22 is swung down to its horizontal position to provide for unloading of the finished tire. The tread assembly 52 is then stitched to the carcass 57 by suitable means as described by reference in U.S. Pat. No. 3,475,254 to finish the assembly of the tire as shown in FIG. 5. Bladders 19 and 20 are then concurrently deflated, with garter springs 79 urging segments 71 radially inwardly, to collapse drum 10 to its minimum diameter, and the finished tire is unloaded from building drum 10 over the outboard annular extension 15, after which the tire is cured in a suitable mold. Inasmuch as the minimum diameter of drum 10 and extension 13 smalthan the diameter of the inner diameter of bead portions 72 and 73, the tire can be easily removed from drum 10 over extension 13 without ovalizing the tire or disassembling the drum.

Figure 6:
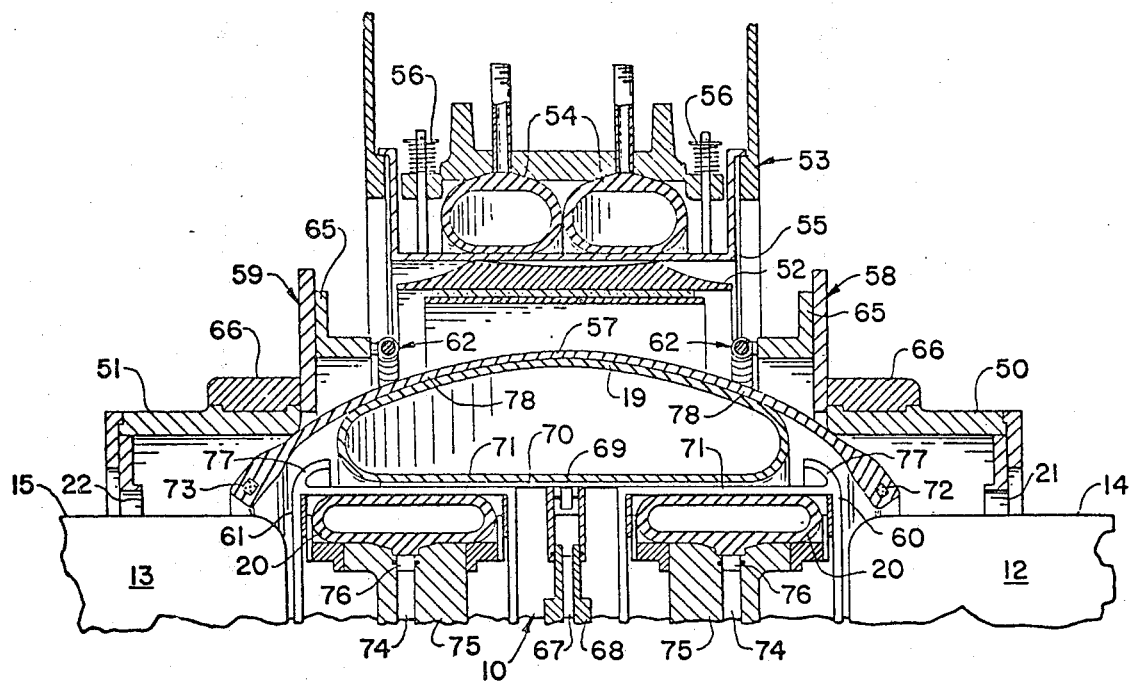
FIGS. 6 through 8 are partial cross-sectional views in elevation of a pneumatic tire building machine in various stages of an alternative operation in accord with and embodying the present invention.
Figure 8:
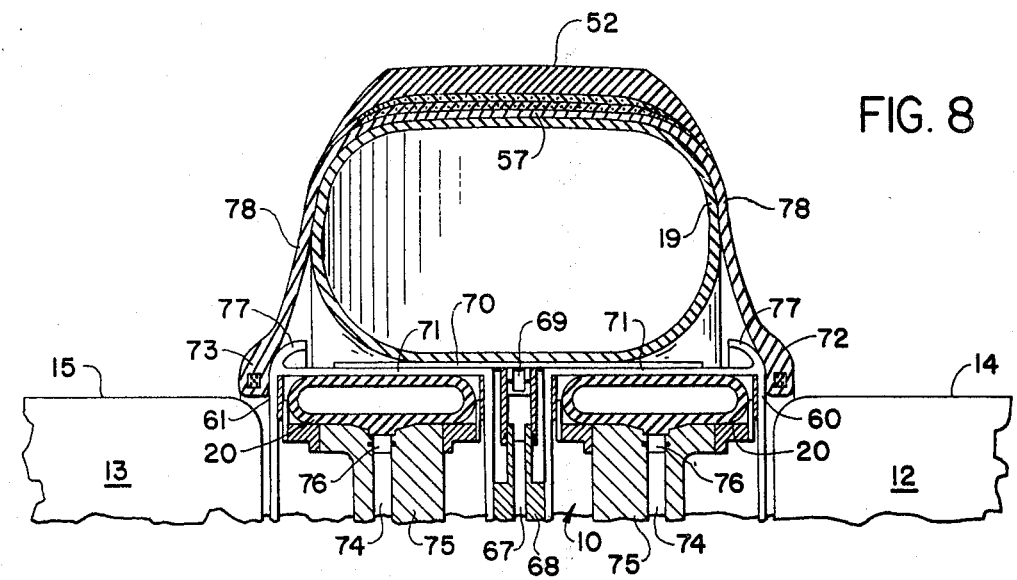

Referring to FIGS. 6 through 8, the sequential steps of an alternative method of expanding carcass 57 is shown. There the bead portions 72 and 73 are free floating at all times, rather than the bead portions 72 and 73 being pushed toward each other as shown in FIG. 4. Specifically, instead of initially deflating shoulder bladders 20 as shown in FIG. 2, inflation of the shaping bladder is commenced immediately. The steps of precision toric mating of the carcass 57 with the tread assembly 52 are basically the same as above described in reference to FIGS. 2 through 5.

The foregoing description of the tire building apparatus of this invention, including the carcass building and shaping drum, the tread and belt assembly drum, and the transfer mechanism as described in U.S. Pat. No. 3,475,254, has provided a suitable basis for illustrating the details of this invention. However, it should be understood that the invention is not limited to this description, but rather is limited by the scope of the appended claims. There are many variations, both in the equipment and in the method of producing a tire, which are likewise intended as falling within the scope of the invention. For example, the various parts of this tire building machine, as well as the entire machine, may be used with other or additional apparatus, if this is found to be necessary or helpful in the building of a pneumatic tire. For instance, the tread and belt assembly drum can be provided with a stitcher, either of the type shown in connection with a carcass building drum or otherwise, for stitching the tread and belt strips together prior to transferring to the carcass drum. Likewise, the stitcher previously described in connection with the carcass drum can be omitted entirely and the stitching operation done by hand. Furthermore, it is contemplated that various modifications can be made in the design, size, or number of various components used in either of the drums, such as the rigid segments, the gap shields, the number of bladders, etc.

I claim:

1. In apparatus for making pneumatic tires and including a rotatable building drum adapted for use in building a tire carcass and expanding the carcass to a toric chape, and a transfer means for positioning a tread and belt assembly substantially concentrically over and radially spaced from said drum, the improvement which comprises:

two annular guide members coaxial with said drum and movable axially toward and away from one another between a widely spaced retracted position and an inward operating position surrounding said drum for contacting said tire carcass on expansion thereof said guide members each comprising a core ring of circular cross section, supported at spaced circumferential locations, and rolling means received on said core ring and adapted for free rotary movement thereon about the circular axis defined by the center of the core ring cross section, whereby said tire carcass on expansion thereof contacts said guide members in rolling engagement with said rolling means so that said guide members guide said carcass to accurately mate with said tread and belt assembly.

2. Apparatus as defined in claim 1 wherein said rolling means comprises a plurality of flexible helical segments slidably received on said core ring and adopted to roll thereabout.

3. Apparatus as defined in claim 1 wherein said core ring comprises a plurality of curved arcuate segments arranged in end-to-end relation to form a closed circle.

4. Apparatus as defined in claim 1 wherein said segments are supported by axially extending posts.

5. Apparatus as defined in claim 1 wherein said annular guide members are supported by bead carrier means for seating bead rings in forming the bead portions of the tire carcass.

6. In apparatus for making radial type pneumatic tires and including a rotatable building drum for use in forming thereon a tire carcass of rubberized plys and for expanding the carcass to a toric shape with the cords of said plys in radial planes, a pair of bead ring setting members on opposite sides of and coaxial with said drum and movable axially toward and away from one another for seating bead rings at bead receiving shoulders at each side of the building drum in forming the bead portions of the tire carcass, and a transfer means for positioning a tread and belt assembly substantially concentrically over and radially spaced from said drum, the improvement which comprises:

two annular guide members coaxial with said drum and supported, one by each of said bead ring setting members for movement therewith axially toward and away from one another between a widely spaced retracted position and an inward operating position surrounding said drum for contacting said tire carcass on expansion thereof, said guide members each comprising a core ring of circular cross section connected to its respective bead setting member at spaced circumferential locations, and rolling means on said ring and adapted for free rotary movement thereon about the circular axis defined by the center of the core ring cross section, whereby said tire carcass on expansion thereof, contacts said guide members in rolling engagement with said rolling means so that said guide members guide said carcass to accurately mate with said tread and belt assembly.

7. Apparatus as defined in claim 6 wherein said core ring is supported by a plurality of axially extending posts connected at circumferentially spaced locations between said core ring and its respective bead ring setting member.

8. Apparatus as defined in claim 6 wherein said core ring comprises a plurality of curved arcuate segments arranged in end-to-end relation to form a closed circle.

9. Apparatus as defined in claim 8 wherein said rolling means comprises a plurality of flexible helical segments slidably received on corresponding portions of said core ring segments.

* * * * *